United States Patent [19]

Lee

[11] 4,264,935

[45] Apr. 28, 1981

[54] BALANCED TAPPED DELAY LINE SPECTRAL SHAPING DIFFERENTIATION CIRCUIT FOR SIGNAL DETECTION

[75] Inventor: Patrick S. Lee, Campbell, Calif.

[73] Assignee: Sperry Corporation, New York, N.Y.

[21] Appl. No.: 138,639

[22] Filed: Apr. 9, 1980

[51] Int. Cl.³ .............................................. G11B 5/09
[52] U.S. Cl. ..................................................... 360/45
[58] Field of Search .............................. 360/45, 46, 65

[56] References Cited

U.S. PATENT DOCUMENTS

| | | | |
|---|---|---|---|
| 3,775,759 | 11/1973 | Armitage, Jr. et al. | 360/45 |
| 4,081,756 | 3/1978 | Price et al. | 360/45 |

*Primary Examiner*—Vincent P. Canney

*Attorney, Agent, or Firm*—Thomas Schneck, Jr.; Eugene T. Battjer; William E. Cleaver

[57] ABSTRACT

A tapped delay line (39) terminated with its characteristic impedance at both ends is connected to receive a differential input signal across ends (35, 37) of the delay line. Delay line taps 41, 43), as well as ends, are connected symmetrically to a pair of summing networks (71, 73) where voltage signal components having different delays from the input signal are linearly combined. The output waveforms from both summing networks are combined to provide a balanced differential signal that has been both amplitude equalized and differentiated from the input signal with variable amplitude for use in a signal detector (87, 89) that requires such a shaped signal waveform.

10 Claims, 5 Drawing Figures

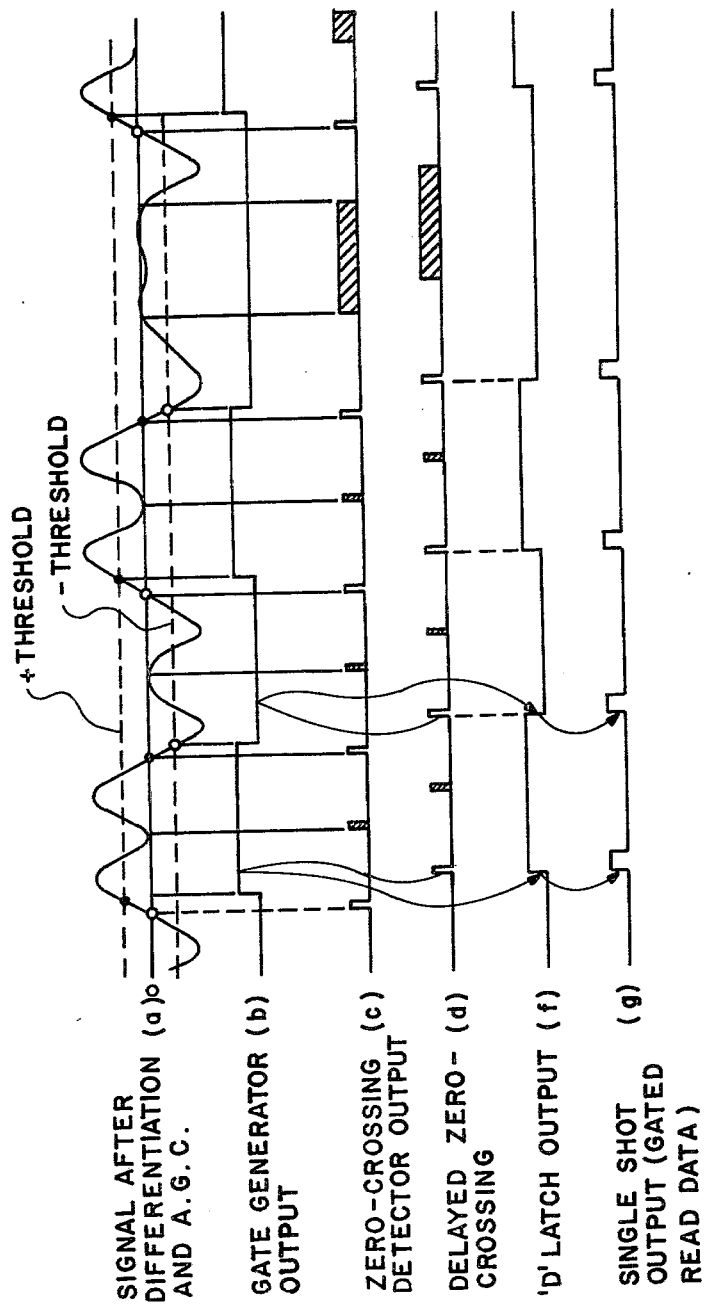

BALANCED TAPPED DELAY LINE SPECTRAL SHAPING DIFFERENTIATION CIRCUIT FOR SIGNAL DETECTION

BACKGROUND OF THE INVENTION a. Field of the Invention.

The invention relates generally to the processing of analog or digital signals and in particular to a circuit for use in amplitude spectrum equalization and differentiation of signals the peaks of which are representative of digital data.

b. Prior Art.

In signal processing and in particular the magnetic data storage and retrieval art, equalization or waveform compensation is the term applied to the process of shaping signals, e.g. those picked up by a magnetic read head in digital magnetic recording, so that data bits can be recovered accurately. The readback signal of digital magnetic recording is a summation of isolated pulses each of which is similar to a bell-shaped curve and can be characterized as a Lorentzian pulse in the time domain. The peak of each of these isolated readback pulses represents a written transition on the storage medium. These readback pulses are essentially unbound in time and have long tails preceding and following the peak of the pulse. Therefore one reason that equalization is necessary in magnetic storage playback is that magnetic flux transitions are recorded so densely on the storage medium, that adjacent readback pulses can influence each other to cause pulse crowding or pulse interference. This pulse crowding phenomenon results in peak shift or bit shift and also pattern dependent amplitude variation. By means of amplitude spectrum equalization of the unequalized readback isolated pulses, the after equalization pulse is completely bound in time and its signal level returns to zero in a relatively shorter time and remains there. If the signal level of each equalized isolated pulse drops to a nearly zero signal level before the occurrence of the peak of the next pulse, then pulse interference or pulse crowding is eliminated. This pulse slimming or pulse narrowing technique corrects for peak shift and variable peak amplitude problems in the unequalized readback signal waveform. This correction means yields a readback signal waveform whose amplitude is frequency and data independent, i.e. a constant peak amplitude output signal, and whose peaks have negligible peak shift. An amplitude equalizer should cause minimum degradation of the signal to noise ratio and also cause a minimum amount of ringing on the baseline of the equalized isolated pulse.

In equalizers of the prior art, such as in U.S. Pat. No. 4,081,756 to R. Price, G. Jacoby and A. Geffon the equalized signal is transmitted to a peak detection channel which includes a differentiation circuit to define the peak positions of the signal and a detector, such as a zero crossing detector, produces digital pulses representing peaks of the readback signal, which consist of true data peaks and noise induced peaks. By means of the equalization and ideal differentiation, the timing accuracy of the relative peak positions of the readback signal representing the digital information written on the medium is maintained. In the aforementioned patent the equalized signal is also transmitted to another amplitude detection channel, referred to as the "gate generator", to produce pulses or gates whenever the constant peak amplitude signal exceeds a predetermined threshold. These gates, corresponding to the true data peaks, are used to examine and indicate the true data peak positions detected by the peak detection channel. In short, use of an equalizer to shape the amplitude spectrum of the input signal so as to slim the isolated pulse and compensate the amplitude of the composite waveform can increase the magnetic storage density.

The aforementioned patent shows a balanced equalizer in FIG. 11. Two separate delay lines were terminated by emitter followers to approximately simulate open circuit termination in an attempt to provide total signal reflection. An input to each delay line was cross-connected to the output of the other delay line through another emitter follower and the two cross-connects were used as inputs to a differential amplifier, followed by a Bessel filter. This equalizer is suitable for shaping the input signal to a dual channel signal detector, as described in the patent. One channel, including a differentiator, is used for peak detection. The other channel is used for amplitude detection, i.e. gate generation, over a threshold level. The outputs of both channels are fed to an AND gate which produces the digital output readback signal. Note that equalization and differentiation in the above patent were achieved using different circuits.

In U.S. Pat. No. 3,516,066 issued on June 2, 1970, G. V. Jacoby discloses an equalizer comprising amplitude and phase compensation circuits followed by a delay line differentiator. The theory of delay line differentiators is also discussed in an article entitled "The Use of Delay Lines in Reading a Manchester Code" by T. H. Chen in IEEE Transactions on Computers, September, 1968.

In the book entitled "Data Transmission", by Bennett and Davey, p. 269, there is a discussion of transversal filters formed by tapped delay lines. The author points out that any correction in amplitude characteristics of a signal with respect to frequency can be brought about by a transversal filter. Note that such a transversal filter has a single ended input and single ended output, and is therefore unbalanced.

In U.S. Pat. No. 3,408,640 issued on Oct. 29, 1968, Masson discloses two separate tapped delay lines for use in reading high density magnetically recorded data. Selected taps in each branch are connected to a resistor summing network for equalizing data waveforms. The two separate delay line branches are terminated in their characteristic impedances and are used in an unbalanced manner like the transversal filter.

While the equalizers of the prior art are quite useful, there is a need for improved equalization. For optimum performance in read signal detection, it is desirable to have two separate amplitude spectrum equalizers, one for the peak detector and one for the gate generator, and it is also desirable to have a delay line differentiator. However, implementation of separate delay line equalizers and a differentiator into the system is not only expensive but also generates more electronic noise and delay line matching difficulties.

SUMMARY OF THE INVENTION

An object of the present invention is to provide a balanced delay line differentiator with built in spectral shaping equalization for waveform compensation.

The above object has been achieved by means of a symmetrically tapped delay line receiving a variable peak amplitude input signal, e.g., representative of magnetically recorded digital data, along differential input lines and connected to a plurality of signal summing junctions each of which, in turn, connected to selected taps and ends of the delay line. The delay line is end fed by a differential voltage input signal through impedances matched to the characteristic impedance of the delay line so the tapped delay line is used in a balanced differential mode. The taps are symmetrically spaced between the ends at intervals forming equal delay elements. The taps provide component signals with incremental delays from the input signal to two summing junctions. Two linear combinations of these component signals formed at the two summing junctions results in a pair of differential signals incorporating delays of zero, one, two and three delay element times of the differential double ended input signal. These two signals at the output of the summing junctions are then combined to produce a balanced double ended output differential signal which is the slimmed and differentiated version of the input signal for use in a dual channel signal detector.

An advantage of the present invention is that the signals developed along the symmetrically tapped delay line are self-balanced. Another advantage is that a single circuit component performs the dual functions of amplitude spectrum equalization for pulse slimming and signal differentiation needed in a dual channel signal detector for sensing the peaks of the signal.

BRIEF DESCRIPTION OF THE DRAWINGS

FIG. 5 shows waveforms indicating ideal operation of the present invention in a dual channel data readback system.

DESCRIPTION OF THE PREFERRED EMBODIMENT

Figure 1:
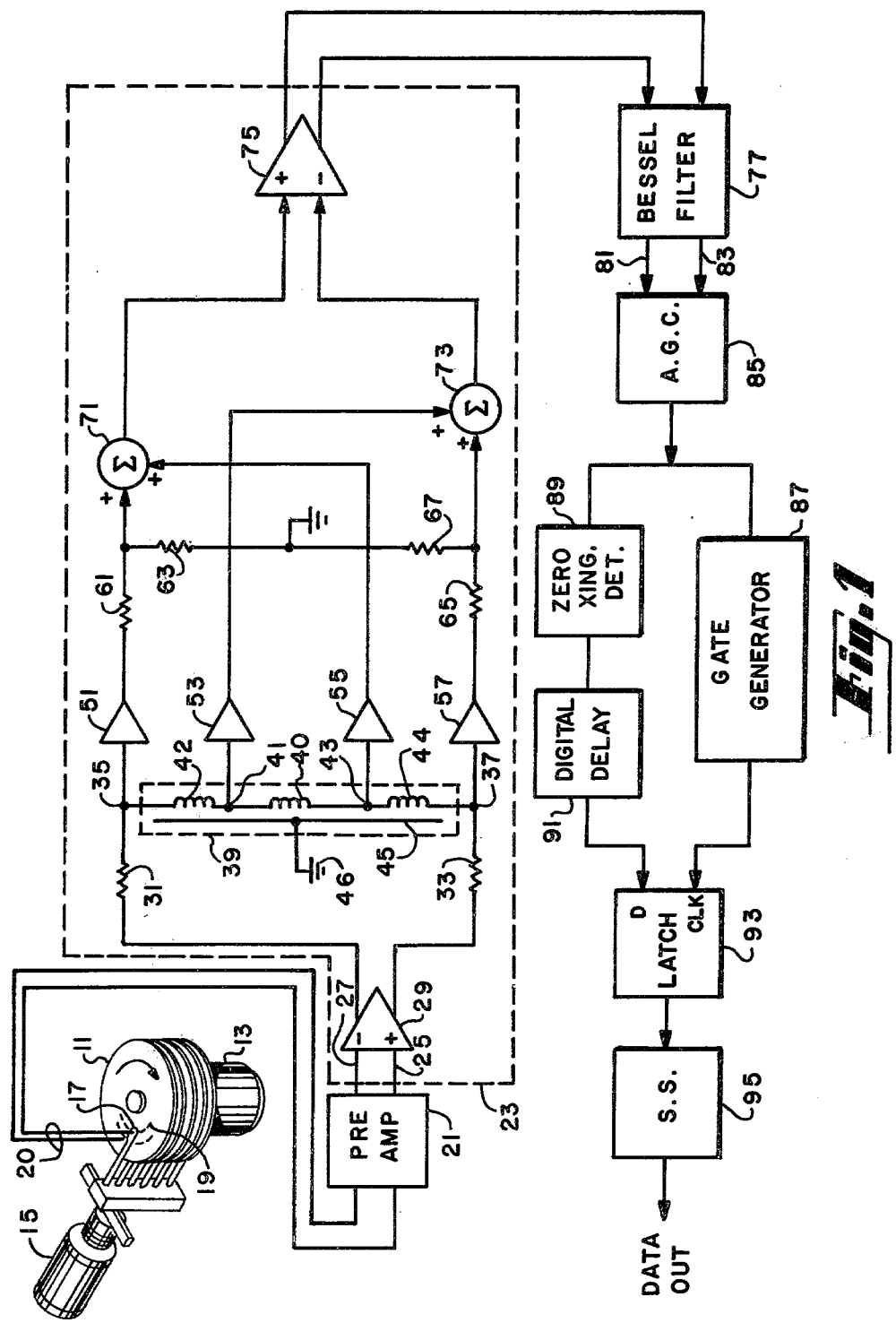
FIG. 1 is a schematic drawing of the present invention shown in a dual channel system for reading data recorded on a magnetic disk.

The schematic of FIG. 1 shows a disk pack 11 having magnetic disks rotating in the direction indicated by the arrow by means of rotational force applied by the motor 13. A linear motor 15 sets the position of the magnetic head 17 relative to tracks 19 on a disk passing beneath the head 17. Differential output signals from magnetic head 17 are taken along the pair of wires 20 and transmitted to a signal preamplifier 21, which is a differential amplifier. The input signal to preamplifier 21 is derived from opposite ends of a coil which is part of the magnetic head pickup assembly. Preamplifier 21 may also include a phase equalization circuit for phase compensation. The output of preamplifier 21 is also a differential signal which is applied to the circuit of the present invention shown within the dashed line 23.

While the present application discusses amplitude spectrum equalization for pulse slimming or shaping and differentiation of signals derived from magnetic media, and disks in particular, it should be realized that the present invention has applicability to the general field of analog or digital signal processing and is not restricted to reading of magnetically recorded digital data. If other than magnetically read data is processed, a differential input signal would be applied to a preamplifier 21 and then fed into circuit 23, or if preamplification was not necessary, directly into circuit 23.

The inputs to circuit 23 constitute the pair of differential input signal lines 25, 27 which communicate directly or indirectly with a signal source, such as the magnetic head 17. These input lines are connected to a differential amplifier 29 which has a constant gain, $G_1$ and negligible output impedance. The differential output from this amplifier is fed to the resistors 31, 33. Each of the resistors 31, 33 has another end connected to one of the opposite ends 35, 37, respectively, of a tapped delay line. The resistance of the resistors 31, 33 is equal to the characteristic impedance of the delay line so that wave reflections from the ends of the delay line are avoided. The delay line, except for the first and second ends, 35, 37, is surrounded by the dashed line 39. Delay line 39 has at least two intermediate taps 41, 43 which are symmetrically spaced between opposite ends 35, 37 dividing the delay line into three sections. In this preferred embodiment, the three sections have the same time delay, T, so that the delay of the central section 40 can be combined with the delay of an end section 42 on the one hand, and a delay of the opposite end section 44, on the other hand. Alternatively, the three sections can be combined to form a delay equal to the sum of the delays of the three sections, that is equivalent to 3T. It should be noted that the outer conductor 45 of the delay line is grounded at terminal 46.

The delay line 39 is an electromagnetic, lumped constant delay line, resembling an electromagnetic transmission line in electrical characteristics. Outputs from the delay line 39 are taken from opposite ends 35, 37 and from the intermediate taps 41, 43. Outputs from each of these taps is fed through the unity gain buffer amplifiers 51, 53, 55 and 57 which isolate the delay line from the summing junctions 71, 73 to which the outputs of the buffer amplifier are connected. The summing junctions can be resistor type summing networks or other summing means. Buffer amplifier 51 is connected to summing junction 71 through the resistor network 61, 63. Resistor 61 has a value equal to R1, while resistor 63 has a value equal to R2. Buffer amplifier 57 is connected to summing junction 73 through the resistor network 65, 67. Resistor 65 has the value R1, while resistor 67 has the value R2. Both resistor networks 61, 63 and 65, 67 are used as a gain multiplier with gain less than one. Summing junction 71 also has an input from buffer amplifier 55, while summing junction 73 also has an input from buffer amplifier 53. The summing junctions 71 and 73 are implemented with summing networks. It can be seen that the signal components to be summed in each of the summing junctions 71, 73 includes a first signal from one center tap at one side of the central section 40 of the tapped delay line 39 and also another signal from the opposite end of the delay line, which is two delay elements away from the first signal. The inputs to both summing junctions are the delayed version of the output signal of amplifier 29 and are summed at the junctions. The outputs from junction 71, 73 are fed to differential amplifier 75 having a constant gain $G_2$ to yield a balanced differential output signal for a Bessel filter 77.

The circuit shown within the dashed line 23 has a voltage transfer function, i.e. voltage output divided by voltage input, as follows:

$$H(f) = \left[ K_1(1 - K_2\cos\omega T) \cdot j \sin\frac{\omega T}{2} \right] \cdot e^{-j\omega(1\frac{1}{2}T)} \quad (1)$$

where
T = delay time of each section of the delay line
$K_1 = 2G_2$ $$K_2 = 2\left(\frac{R2}{R1}\right) = G_1\left(\frac{R2}{R1+R2}\right)$$

$$G_1 = 2\left(\frac{R1+R2}{R1}\right)$$

In equation (1) the cosine term $K_1(1-K_2 \cos \omega T)$ represents an amplitude spectrum shaping term for pulse slimming purposes, while the sine term represents a differentiation term. The transfer function of equation (1) acts on input waveform resulting from the superposition of isolated readback bell-shaped pulses which can be characterized as Lorentzian, expressed by the equation:

$$L(t) = 1/[1 + (2t/T_{50})^2]$$

where t denotes time and $T_{50}$ is the time duration between half normalized peak amplitude points before shaping. The exponential term denotes the $1\frac{1}{2}T$ delay time between the output signal and the input signal of the spectral shaping differentiation circuit 23. This delay is not important because the delayed output signal which is the slimmed and differentiated version of the input signal is used for both peak detection and amplitude detection channel as seen in FIG. 1. The peak detection channel consists of the zero-crossing detector 89 and the digital delay circuit 91, and the amplitude detection channel is the gate generator 87. The output of these two channels is then fed to a latch 93 followed by a single shot multivibrator to form the data representative digital output pulses.

Figure 2:
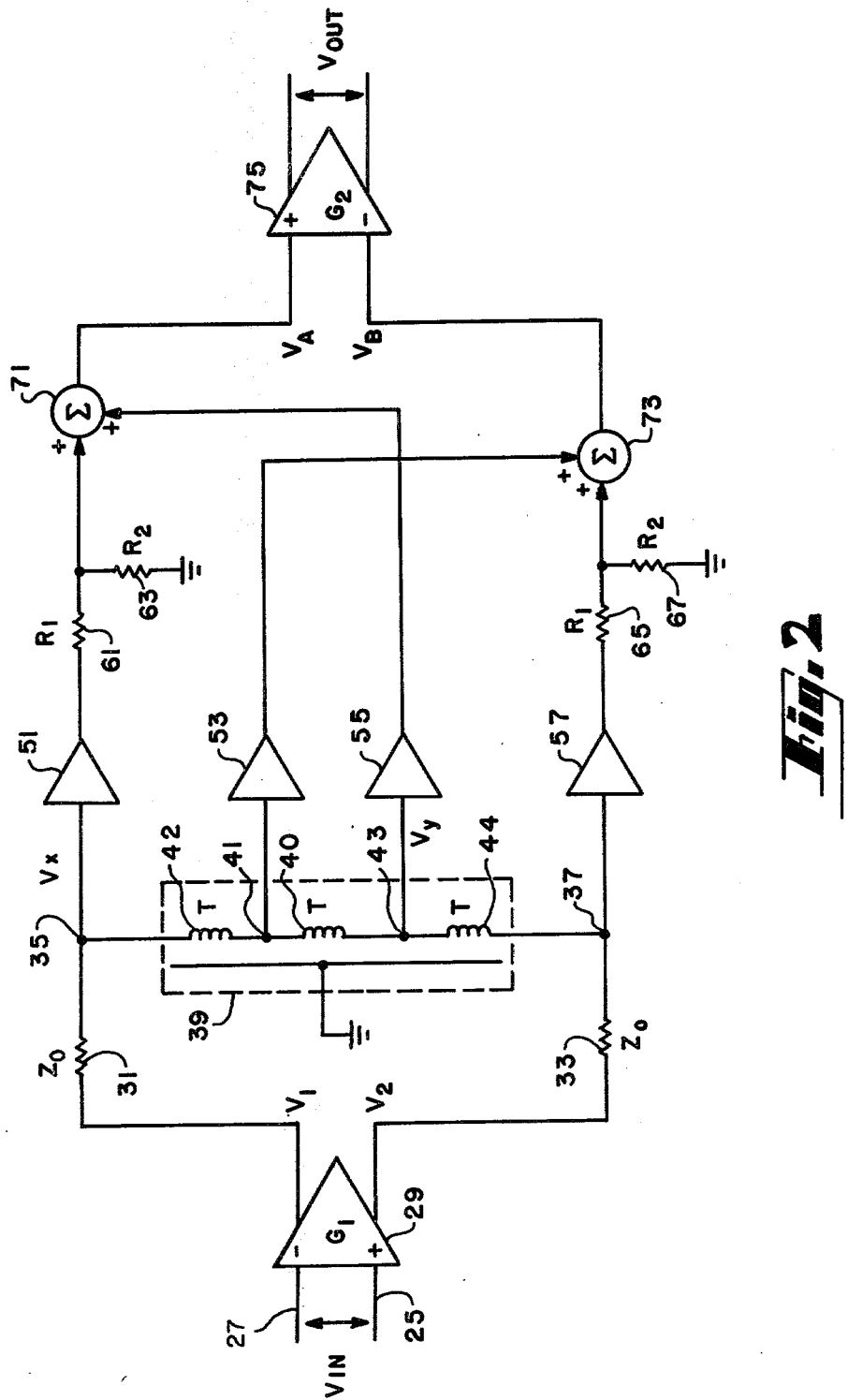
FIG. 2 is a schematic of the balanced tapped delay line spectral shaping differentiation circuit of the present invention.

In order to explain the operation of the circuit, the delay line spectral shaping differentiation circuit is redrawn as in FIG. 2. Let $V_1$, $V_2$ represent the doubled ended differential outputs of the differential amplifier 29. Since the delay line is terminated at both ends with its characteristic impedance $Z_o$, any output signal taken from any one of the taps 35, 41, 43, 37 of the tapped delay line is made up with two signal components. The first signal component is derived from $V_1$ and is equal to $\frac{1}{2}V_1(t-mT)$ where mT is the total delay of the number, m, of delay sections between one end, 35, of the tapped delay line 39 and the particular tap from which the output signal is taken. The second signal component is derived from $V_2$ and is equal to $\frac{1}{2}V_2(t-nT)$ where nT is the total delay of the number, n, of delay sections between the other end, 37 of the tapped delay line 39 and the particular output tap from which the output signal is taken. These signal components have half the magnitude of $V_1$, $V_2$ respectively because the impedance looking into the delay line at its ends, 35 or 37, is the characteristic impedance $Z_o$, which has the same value as the termination resistors, 31 and 33. Therefore in time domain, the signal at one end, 35, of the delay line is $V_x(t)$.

$$V_x(t) = \tfrac{1}{2}V_1(t) + \tfrac{1}{2}V_2(t-3T) \text{ for } m=0, n=3$$

Similarly, the signal taken from tap 43 is $V_y(t)$.

$$V_y(t) = \tfrac{1}{2}V_1(t-2T) + \tfrac{1}{2}V_2(t-T) \text{ for } m=2, n=1$$

If $$\frac{R_2}{R_1} = b$$

and the multiplier $$\frac{R_2}{R_1+R_2} = \frac{b}{1+b}$$

then the signal at the output of the summing network 71 is $V_A(t)$ in time domain or $V_A(f)$ in frequency domain where $$V_A(t) = \frac{b}{2(1+b)}[V_1(t) + V_2(t-3T)] + \tfrac{1}{2}[V_1(t-2T) + V_2(t-T)]$$

$$= \frac{1}{2(1+b)}[bV_1(t) + (1+b)V_1(t-2T) + bV_2(t-3T) + (1+b)V_2(t-T)]$$

$$V_A(f) = \frac{1}{2(1+b)}\{V_1(f)[b + (1+b)e^{-j\omega(2T)}] + V_2(f)[be^{-j\omega(3T)} + (1+b)e^{-j\omega T}]\}$$

In these expressions, $V_1(f)$ and $V_2(f)$ are the Fourier transforms of $V_1(t)$ and $V_2(t)$ respectively.

Since the whole circuit is balanced, the signal $V_B(f)$ at the output of the summing network 73 has a similar relationship with $V_1(f)$ and $V_2(f)$. In other words, the expression for $V_A(f)$ can be used for $V_B(f)$ when $V_1(f)$ is substituted by $V_2(f)$ and vice versa in the expression for $V_A(f)$.

The output $V_{out}(f)$ of the differential amplifier 75 in frequency domain is therefore equal to the differences of $V_A(f)$ and $V_B(f)$, multiplied by the gain $G_2$ of the amplifier. That is $$V_{out}(f) = G_2 \cdot \left[\frac{V_2(f) - V_1(f)}{2(1+b)}\right] \cdot$$
$$[-b + (1+b)e^{-j\omega T} - (1+b)e^{-j\omega(2T)} + be^{-j\omega(3T)}]$$

Putting the gain $G_1$ of the differential amplifier 29 equal to $2(1+b)$ and making use of the Euler's theorem of the trigonometric identities, the transfer function of the circuit can be derived as shown in equation (1). That is $$H(f) = \frac{V_{out}(f)}{V_{in}(f)} =$$
$$\left[2G_2(1 - \frac{2R_2}{R_1}\cos\omega T) \cdot j \sin\frac{\omega T}{2}\right] \cdot e^{-j\omega(1\frac{1}{2}T)}$$

Figure 3:
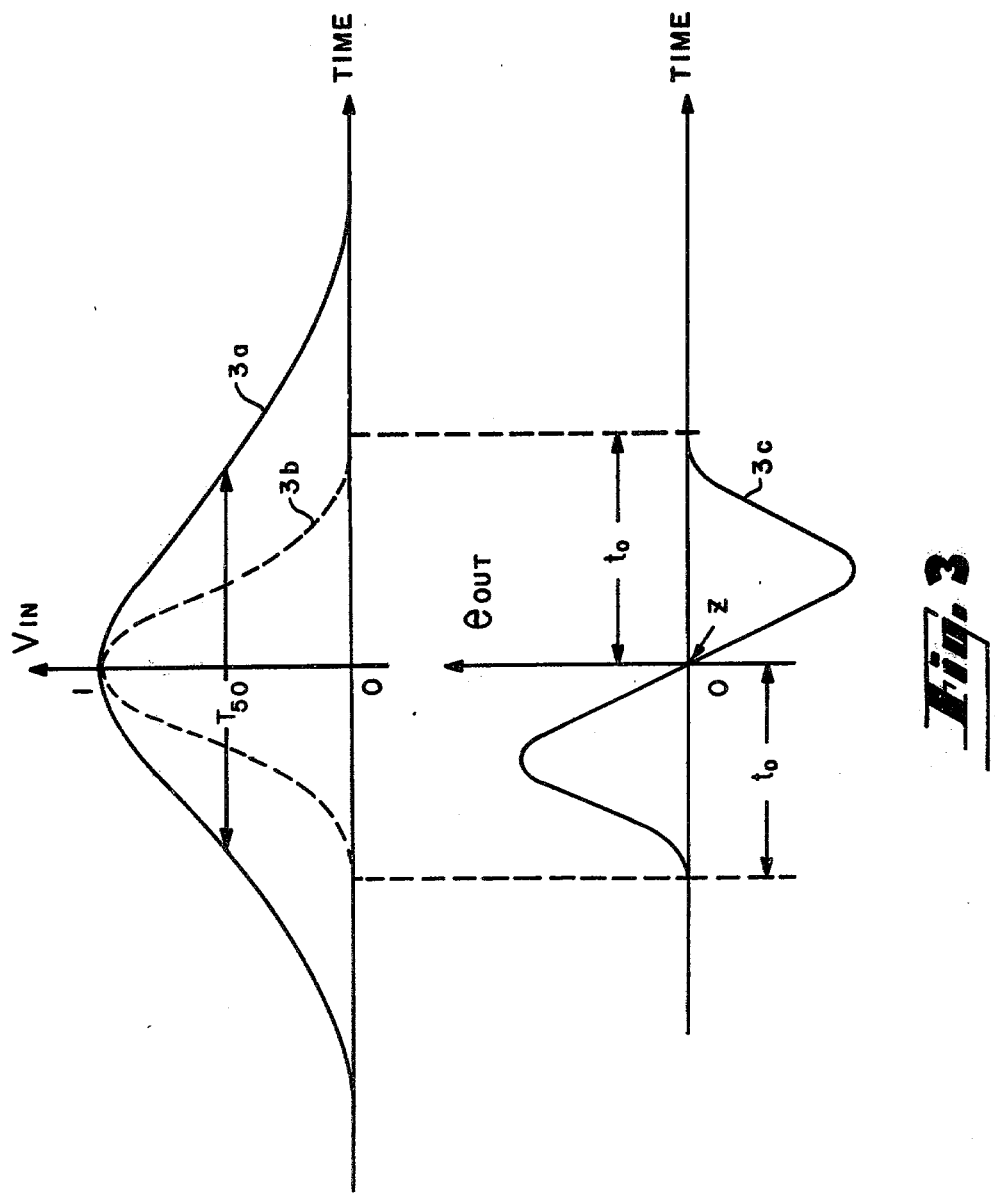
FIG. 3 shows the waveform compensation and differentiation achieved by the present invention.

It has been known that the unequalized readback isolated pulse as shown in FIG. 3 waveform 3a has a Fourier transform of $L(f) = e^{-\pi T_{50}f}$ where $T_{50}$ is the time duration of the readback pulse at the half peak amplitude point. The desired (slimmed) isolated pulse is shown in waveform 3b of FIG. 3 and has Fourier transform of S(f). For instance S(f) can be set equal to $$\cos^4\left(\frac{\pi f}{2f_c}\right)$$

where $f_c$ is the system bandwidth or cutoff frequency for the slimmed isolated pulse. Note S(f) can also be derived by means of other approaches and the circuitry in this invention is therefore not limited to the application for cosine fourth power amplitude spectrum equalization. Waveform 3c in FIG. 3 represents the desirable differentiated isolated pulse which is slimmed to $\pm t_o$ nanoseconds from the zero crossing Z representing the peak position of the unequalized pulse 3a. Therefore the differentiated isolated pulse 3c is substantially flat beyond the zero touching points at $\pm t_o$ from the peak representative zero crossing Z, and these points are made to correspond to the minimum pulse or transition interval $T_{min}$ so as to eliminate pulse interference between adjacent differentiated isolated pulses. The position at which other pulses or transitions occur at intervals greater than the minimum pulse interval $T_{min}$ is of no significance because the equalized differentiated pulses represented by 3c in FIG. 3 are substantially flat at the zero level at positions beyond the minimum pulse interval which depends on the code used in digital magnetic recording. The amplitude spectrum of the equalized and differentiated pulse can be represented by $$[S(f)] \cdot 2 \text{ SIN} \frac{\pi f}{f_c}$$

Figure 4:
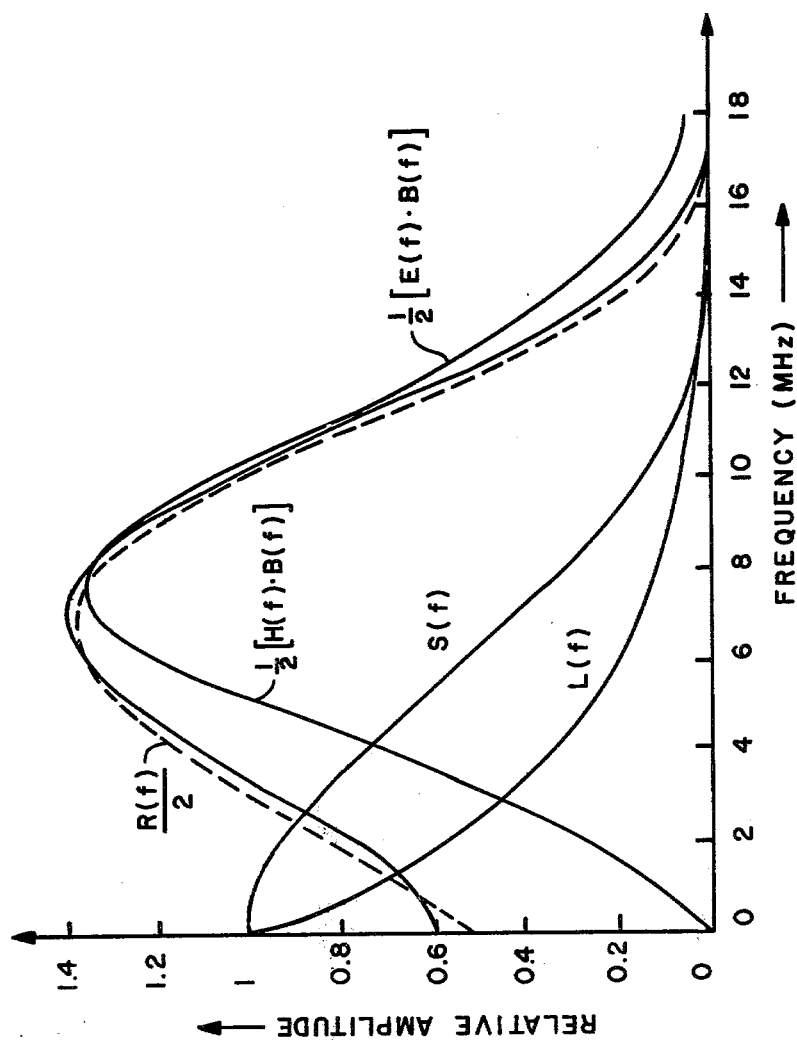
FIG. 4 is a graph of the relative amplitude spectrum plotted against frequency of Fourier transforms for an isolated readback data pulse, before and after spectral shaping. The graph also shows the desired and the implemented transfer functions associated with the present invention.

FIG. 4 shows the relative amplitude of the amplitude spectrums of the isolated pulse signal waveform before and after equalization and differentiation. In order to transform the unequalized Lorentzian isolated pulse, 3a, with Fourier transform L(f) into a slimmed isolated pulse 3b with said cosine fourth power spectrum S(f), the required equalization R(f) is thus equal to S(f)/L(f) and can be represented mathematically to a close approximation as $$R(f) \approx [K_1(I - K_2 \cos \omega T)] \cdot B(f) = E(f) \cdot B(f)$$

where $K_1$, $K_2$ are design constants, $$T = \frac{1}{f_d}$$

is a frequency scaling parameter and B(f) is a fourth order Bessel filter. The Bessel filter is used to help the shaping of the amplitude spectrum equalization so that the result is more close to S(f)/L(f), and is also used to reject high frequency noise outside the system bandwidth. In order to detect the peak position of the equalized pulse, the equalized pulse is differentiated so that the zero crossing of the differentiated pulse can be detected to define the peak or data bit position. Delay line differentiator with SIN $\pi f T$ transfer function is preferred because it maximizes the signal amplitude at the signal frequency range, but minimizes the high frequency noise response by means of its fixed maximum gain. In this invention, the delay line differentiator function is provided by the equalizer at the same time as shown by the transfer function H(f) of equation (1) generated by the circuit, 23, in this invention. In other words, this invention provides a simple tapped delay line circuit to incorporate spectral shaping equalization into a delay line differentiator in order to yield an optimum, slimmed and differentiated readback signal for peak detection with negligible pulse interference problems. Therefore combining the transfer function H(f) obtained by the balanced tapped delay line spectral shaping differentiator, 23, and the following Bessel filter 77, the desired equalization-differentiation function for optimum differentiated readback signal can be produced as $$D(f) = H(f) \cdot B(f) = \left[ K_1(1 - K_2 \cos \omega T) \cdot j \text{ SIN} \frac{\omega T}{2} \cdot e^{-j\omega(1\frac{1}{2}T)} \right] \cdot B(f)$$

Since the delay line differentiation function $$\text{SIN} \frac{\omega T}{2}$$

is not exactly equal to those of ideal resistor-inductor or resistor-capacitor type differentiators in the signal frequency range, the differentiated pulse by means of delay line differentiator has a wider baseline width than that achieved by RL or RC differentiator. In order to cope with this problem, the bandwidth of the equalization function $$E(f) = K_1(I - K_2 \cos \omega T)$$

is slightly increased. Or in other words, the equalized isolated pulse, 3b, shown in FIG. 3 is slightly overslimmed so that after the delay line differentiation and the Bessel filter the differentiated pulse, 3c in FIG. 3, will be well time-contained within $\pm t_o(=\pm T_{min})$ from the peak representative zero-crossing.

FIG. 4 shows the relative amplitude of the Fourier transforms of the isolated pulse before and after equalization and the transfer function of the circuit implementation disclosed in this invention for a particular case with the following signal characteristics: $T_{50}=85$ nanoseconds, $t_o=T_{min}=80$ nanoseconds. For $t_o=80$ nanoseconds, the required system bandwidth $f_c$ for the slimmed isolated pulse should be 16 MHz theoretically. But because of the effects of the delay line differentiator on the isolated pulse, the bandwidth $f_c$ is increased to 18 MHz.

To design the circuit parameters of the delay line spectral shaping differentiator, the delay time T of each section of the tapped delay line 39 is chosen such that the frequency scaling parameter $$f_d\left(=\frac{1}{T}\right)$$

is set approximately equal to the system bandwidth $f_c$. The corner frequency $f_B$ of the Bessel filter B(f) which is preferably a four pole filter, but can be a six pole filter, is set at half of $f_c$. Therefore in this example, the delay time element T is set at 55 nanoseconds and the corner frequency of the Bessel filter is set at 9 MHz. Then the approximate equalization function to be implemented is determined by R(f)/B(f) where R(f) is the required equalization for the proper slimming of the isolated pulse. $K_1$, $K_2$ are then estimated and adjusted to achieve a minimum error between the filtered equalization function and R(f). The circuit is therefore designed with $K_1 = 2.6$, $K_2 = 0.54$. Then by means of the built-in delay line differentiator, the signal $e_{out}$ at the output of the Bessel filter is the optimum differentiated pulse slimmed to the specification to avoid pulse interference. Note $f_d$, $K_1$, $K_2$ and $f_B$ should be optimized based on the differentiated signal at the output of the Bessel filter until the best signal performance is achieved. With $K_1$ and $K_2$ defined, the values of $R_1$, $R_2$, $G_1$ and $G_2$ can be determined.

The output waveform of the Bessel filter 77 which consists of a shaped, slimmed, and differentiated version of the input signal made up with Lorentzian pulses is taken on lines 81 and 83 as shown in FIG. 1 and fed to automatic gain control circuit 85. After passing through the automatic gain control circuit 85, the signal is transmitted to the gate generator circuit 87 which generates a digital gate whenever the differentiated waveform signal amplitude is big enough to pass one predetermined threshold in one direction and then exceed another predetermined threshold in the opposite direction. This can be achieved by means of a comparator circuit with a fixed hysteresis equal to the difference between the two threshold levels. Therefore the differentiated signal is fed to one input terminal of the comparator and the other input terminal is tied to a fixed reference voltage equal to the +threshold. Whenever the output of the comparator changes state, the reference voltage is changed from +threshold to −threshold. The same signal is transmitted to a zero-crossing detector circuit 89 which generates a pulse when a zero crossing of the signal is detected. This zero-crossing can be the representative of the peak position of the readback signal from the read head (transducer) or can be derived from noise peaks. This pulse is delayed in a digital delay circuit 91 for a predetermined time. An output pulse from the digital delay circuit 91, as well as an output pulse from the gate generator 87 are transmitted to a D-type latch 93 where the delayed zero crossing signal is used to clock the latch 93 so that the output of the latch follows the logic state of the gate generator output. Transitions at the output of the latch 93 serve to trigger the single shot 95 and serve to generate data output pulses with fixed duration. This is explained further below with reference to FIG. 5.

Plot (a) of FIG. 5 shows a worse case pattern of the differentiated version of the variable amplitude input readback signal after being processed by circuit 23 of the present invention, Bessel filter 77 and the automatic gain control circuit 85. The tapped delay line circuit of the present invention performs two functions, variable amplitude equalization and differentiation to the input waveform. The shaped signal is measured with reference to positive and negative threshold levels indicated by the horizontal dashed lines as described before and generates gate pulses output as shown in plot (b). These gate pulses are used to examine the zero crossing detector output so as to discriminate those true data or readback signal peak representative zero crossings. The differentiated waveform (a) is also used to indicate peaks of the variable amplitude input signal from the head and such peaks are equivalent to the zero crossings of the differentiated signal, detected by the zero crossing detector 89, and shown in plot (c). Plot (d) shows the output of the zero crossing detector 89 delayed by a slight amount, less than a half-wave but bigger than the duration between the threshold and the true zero-crossing. In the intermediate region between widely separated pulses there is some dithering of the differentiated signal about the zero level, as indicated by the hatched region in plots (c) and (d). This dithering does not represent the peak positions of the readback signal and is treated as noise which is rejected by means of the gate generator and the function of the D latch. Plot (f) shows the output of latch 93 which is latched or clocked to a high state by the delayed zero-crossing detector output pulse when the gate generator output is in high state. The latch output goes low when the gate generator output is in the low state and another delayed zero-crossing pulse arrives to clock the latch. Whenever there is more than one clock pulse from the zero-crossing detector while the data input from the gate generator is set at one logical state, either high or low, only the first clock pulse is effective to change the output state of the D latch. It is designed in this way because there is only one true data peak representative zero-crossing pulse located within each high or low logical state of the gate generator output. This feature helps to reject the dithering noise detected by the zero-crossing detector and gates out the true zero-crossing output pulses represented by the leading edge and trail edge of the D latch output pulses. Therefore by triggering a monostable multivibrator or single shot 95 with these leading and traling edges, pulses of short duration as shown in plot (g) are generated to represent the data or transitions written on the medium.

In summary, the spectral shaping differentiator circuit of the present invention provides a single simple circuit for a dual channel digital magnetic recording readback system whereby use of a single tapped delay line and summing networks generates a balanced and differential output signal that is the differentiated version of an amplitude spectrum equalized read signal. Both pulse shaping equalization and differentiation functions are provided by the same simple circuit making use of a single tapped delay line and configured in a balanced differential mode to minimize signal distortion and to give improved signal to noise ratio over existing circuits in U.S. Pat. No. 4,081,756. This kind of implementation approach can be extended for other functions by increasing the number of taps of the delay line, using different multipliers and summing signal components in a different fashion.

What is claimed is:

1. A signal amplitude equalizing and differentiating circuit comprising,
   a pair of signal differential input lines communicating with a signal source which receives an input, pulse-type signal,
   a delay line having first and second ends electrically connected to said pair of differential input lines through a resistor in each line having a resistance equal to the delay line characteristic impedance, said delay line having at least two intermediate taps symmetrically spaced between said first and second ends, defining "n" delay elements, where "n" is a positive integer, equal to or greater than three, and
   a plurality of signal summing means each connected to receive selected inputs from said first and second delay line ends and from said intermediate taps through different gain multipliers, said summing means having as an output a signal having a linear combination of signal components delayed from the input signal by zero to "n" time delays, and
   a differential amplifier combining the outputs of the summing means whereby the output of said differential amplifier is a differentiated, amplitude spectrum equalized version of the input differential signal.

2. The circuit of claim 1 wherein the number of intermediate taps is two.

3. The circuit of claim 2 wherein said two intermediate taps divide said delay line into a central delay line section and two opposite end sections, all of said sections characterized by an equal time delay.

4. The circuit of claim 3 wherein the number of summing means is two, including a first summing means connected to a first delay line end through a multiplier and to one of said intermediate taps on a side of said central delay line section opposite said first end, and a second summing means connected to a second delay line end through another multiplier and to another of said intermediate taps on a side of said central delay line section opposite said second end.

5. The circuit of claim 4 wherein said output signal is formed by a linear combination of voltage signal component terms characterized by zero, one, two and three time delays from the input signal.

6. A signal amplitude equalizing and differentiating circuit comprising,
   a pair of signal differential input lines communicating with a signal source having a variable amplitude input signal,
   a delay line having first and second ends and two intermediate taps symmetrically spaced therebetween dividing said delay line into three sections, said first and second ends electrically connected through respective impedances to said input lines,
   a first summing means electrically connected to a first delay line end through a multiplier and to an intermediate tap proximate to said second delay line end,
   a second summing means electrically connected to a second delay line end through a multiplier and to an intermediate tap proximate to said first delay line end, and
   a pair of output lines from said first and second summing means, whereby said summing means produce an output signal having a linear combination of delayed signal components and said summing means have their outputs combined differentially to form an amplitude equalized and differentiated version of the input signal.

7. The circuit of claim 6 wherein said impedances are equal to the characteristic impedance of said delay lines.

8. The circuit of claim 6 wherein said three delay line sections are characterized by equal time delays.

9. A dual channel system for detecting data signals comprising,
   input means for picking up a pulse-type signal and converting it to a balanced electrical input signal in a pair of differential input lines,
   a delay line having first and second ends electrically connected to said pair of differential input lines through a resistor in each line having a resistance equal to the delay line characteristic impedance, said delay line having at least two intermediate taps symmetrically spaced between said first and second ends, defining "n" delay elements, where "n" is a positive integer, equal to or greater than three,
   a plurality of signal summing means, each connected to receive selected inputs from said first and second delay line ends and from said intermediate taps through different gain multipliers, said summing means having as an output a signal which is formed by a linear combination of signal components delayed from the input signal by zero to "n" time delays and is a differentiated, amplitude equalized version of the input signal,
   a differential amplifier to combine the outputs of said summing means to produce a balanced and differential output signal that is the differentiated and amplitude spectrum equalized version of the input differential signal,
   amplitude detection means coupled to said differential amplifier output through a Bessel filter for receiving said output signal and producing a gating pulse corresponding to the output signal exceeding a threshold reference level with hysteresis and corresponding to the data representative zero-crossing of the peak detection channel
   zero-crossing detector type peak detection means coupled to said differential amplifier output through a Bessel filter for receiving said output signal and producing a peak representative pulse indicative of a peak of said input signal, and
   logic output latching means coupled to receive said gating pulse and said peak representative pulse and to respond to time coincidence and anti-coincidence between said pulses for forming data output pulses alternately on pulse coincidence and anti-coincidence.

10. A dual channel system for detecting data signals comprising,
    input means for picking up a pulse-type signal and converting it to a balanced electrical input signal in a pair of differential input lines,
    a delay line having first and second ends and two intermediate taps symmetrically spaced therebetween dividing said delay line into three sections, said first and second ends electrically connected through respective impedances to said input lines, and
    a first summing means electrically connected to a first delay line end through a gain multiplier and to an intermediate tap proximate to said second delay line end,
    a second summing means electrically connected to a second delay line end through a gain multiplier and to an intermediate tap proximate to said first delay line end,
    a pair of output lines from said first and second summing means, whereby said summing means produce an output signal which is formed by a linear combination of signal components delayed from the input by different delay times and is an amplitude equalized and differentiated version of the input signal,
    a differential amplifier combining the outputs of said summing means to produce a balanced and differential output signal that is the amplitude spectrum equalized and differentiated version of the input differential signal,
    amplitude detection means coupled to said amplifier output through a Bessel filter for receiving said output signal and producing a gating pulse to correspond to the output signal exceeding a threshold reference level with hysteresis and to correspond to each data representative zero-crossing of the peak detection channel,
    zero-crossing detection means coupled to said amplifier output through a Bessel filter for receiving said output signal and producing a peak representative pulse indicative of a peak of said input signal, and logic output latching means coupled to receive said gating pulse and said peak representative pulse and to respond to time coincidence and anti-coincidence between said pulses for forming data output pulses alternately on pulse coincidence and anti-coincidence.

* * * * *